United States Patent
Livingston et al.

(10) Patent No.: US 8,060,920 B2
(45) Date of Patent: Nov. 15, 2011

(54) GENERATING AND CHANGING CREDENTIALS OF A SERVICE ACCOUNT

(75) Inventors: Sean Lamont Grant Livingston, Bothell, WA (US); Chong Yu, Sammamish, WA (US); Corey Michael Roussel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 12/143,021

(22) Filed: Jun. 20, 2008

(65) Prior Publication Data

US 2009/0320108 A1    Dec. 24, 2009

(51) Int. Cl.
G06F 7/04 (2006.01)
G06F 11/30 (2006.01)
(52) U.S. Cl. .......................... 726/6; 713/184
(58) Field of Classification Search ....... 726/6; 713/184
See application file for complete search history.

(56) References Cited

U.S. PATENT DOCUMENTS

| | | | |
|---|---|---|---|
| 6,769,068 B1 | 7/2004 | Brozowski et al. | |
| 7,058,798 B1 | 6/2006 | Elley et al. | |
| 7,353,536 B1* | 4/2008 | Morris et al. | 726/6 |
| 2006/0156391 A1 | 7/2006 | Salowey | |
| 2006/0224901 A1 | 10/2006 | Lowe | |
| 2006/0230437 A1 | 10/2006 | Alexander et al. | |
| 2006/0248082 A1 | 11/2006 | Raikar et al. | |
| 2006/0271789 A1* | 11/2006 | Satomura et al. | 713/183 |
| 2007/0005956 A1 | 1/2007 | Zilinskas et al. | |
| 2007/0150944 A1 | 6/2007 | Zeng et al. | |
| 2007/0226783 A1* | 9/2007 | Mimlitsch | 726/4 |
| 2009/0100174 A1* | 4/2009 | Annareddy et al. | 709/224 |

OTHER PUBLICATIONS

"User Management Build Guide", Microsoft Technet, Microsoft Corporation, 2008, pp. 12.
Koshutanski, et al., "Interactive Credential Negotiation for Stateful Business Processes", 2005, Springer-Verlag Berlin Heidelberg, Vol. 3477, pp. 17.
Koshutanski, et al., "Interactive Access Control for Web Services", retrieved at <<http://www.ing.unitn.it/~massacci/papers/kosh-mass-04-SEC.pdf, pp. 1-16.
"WebSphere Extended Deployment Version 6.0.x", International Business Machines Corporation 2004, 2005, pp. 369.
Keromytis, et al., "Requirements for Scalable Access Control and Security Management Architectures", ACM Transactions on Internet Technologies, vol. 7, No. 4, Nov. 2007, ACM, pp. 20.
Koshutanski et al., "Interactive Access Control for Web Services," In: *Security and Protection in Information Processing Systems*. 2004. IFIP International Federation for Information Processing, vol. 147/ 2004, downloaded Apr. 24, 2008 from http://www.ing.unitn.il/-massacci/papers/kosh-mass-04-SEC.pdf, 16 pages.

* cited by examiner

*Primary Examiner* — Philip Lee
(74) *Attorney, Agent, or Firm* — Hope Baldauff Hartman, LLC (57) ABSTRACT

Technologies are described herein for generating and changing credentials of a service account. In one method, a credential schedule is retrieved. The credential schedule specifies when a plurality of credentials are scheduled to be changed. A determination is made whether a current credential associated with the service account is scheduled to be changed according to the credential schedule. Upon determining that the current credential is scheduled to be changed, at least part of a new credential is generated. The current credential is replaced with the new credential for the service account.

7 Claims, 5 Drawing Sheets

GENERATING AND CHANGING CREDENTIALS OF A SERVICE ACCOUNT

BACKGROUND

Multiple services operating on a single or multiple computer environment may access a shared resource. In order to control access to the shared resource, credentials (e.g., a username and password) may be provided to each of the services. The credentials may be used to identify a service, thereby enabling a central manager to grant and/or limit access to the shared resource. For example, a first service may be provided with credentials that enable the first service to read and modify data in a database, while a second service may be provided with different credentials that enable the second service to only read data in the database. That is, the credentials provided to the second service may prohibit the second service from modifying data in the database.

One of the larger concerns with implementing a credential-based access system is the strength of the credential. In particular, over a period of time, a credential may be discovered using brute force and other forms of attack. In order to decrease the likelihood that such attacks are successful, at least part of the credential, such as the password, may be changed before a security breach can occur. For example, if a known hacking technique typically takes three months to discover a given credential, the password may be changed every two months as a defensive mechanism in response to the hacking technique.

In a typical implementation, a human administrator manually changes the password for each of the services. However, giving an administrator the responsibility of managing and changing the passwords can raise a number of security issues. In one example, in order for an administrator to recall the password, the administrator may record the password on a piece of paper or some other medium. In this case, a nefarious party with access to the medium can obtain the password. In another example, the administrator who prefers to remember the password instead of recording it may choose a weaker password that can be more easily memorized. In this case, the weaker password can be more easily attacked than a stronger password. As a result, removing the responsibility from the administrator to manage and change the passwords can significantly improve the security of the computing environment.

It is with respect to these considerations and others that the disclosure made herein is presented.

SUMMARY

Technologies are described herein for generating and changing credentials of a service account. In particular, a timer service is provided herein for generating and distributing new credentials across a single or a multiple computer environment. The timer service may operate according to a predefined schedule without human administrator intervention or with substantially reduced administrator intervention.

According to one aspect presented herein, a computer program is provided herein for generating and changing a credential for a service account. The computer program retrieves a credential schedule specifying when a plurality of credentials are scheduled to be changed. The computer program determines whether a current credential associated with the service account is scheduled to be changed according to the credential schedule. Upon determining that the current credential is scheduled to be changed, the computer program generates at least part of a new credential and replaces the current credential with the new credential for the service account.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for changing credentials of a service account. In particular, a timer service is provided for generating and distributing credentials across a single or a multiple computer environment. The timer service may operate according to a predefined schedule without human administrator intervention or with substantially reduced administrator intervention.

As used herein, the term "service account" refers to an account that a server may use when it hosts a web service (hereinafter referred to as a service). In particular, the service account may grant and/or limit access to shared resources (e.g., shared data) according to the service that is provided. These services are usually hosted in a process managed by an application server that performs operations using the identity of a service account. Examples of application servers include, but are not limited to, INTERNET INFORMATION SERVICES ("IIS") and WINDOWS SHAREPOINT SERVICES ("WSS"), both from MICROSOFT CORPORATION. According to embodiments, a service account may be identified by a credential containing a username and a password.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
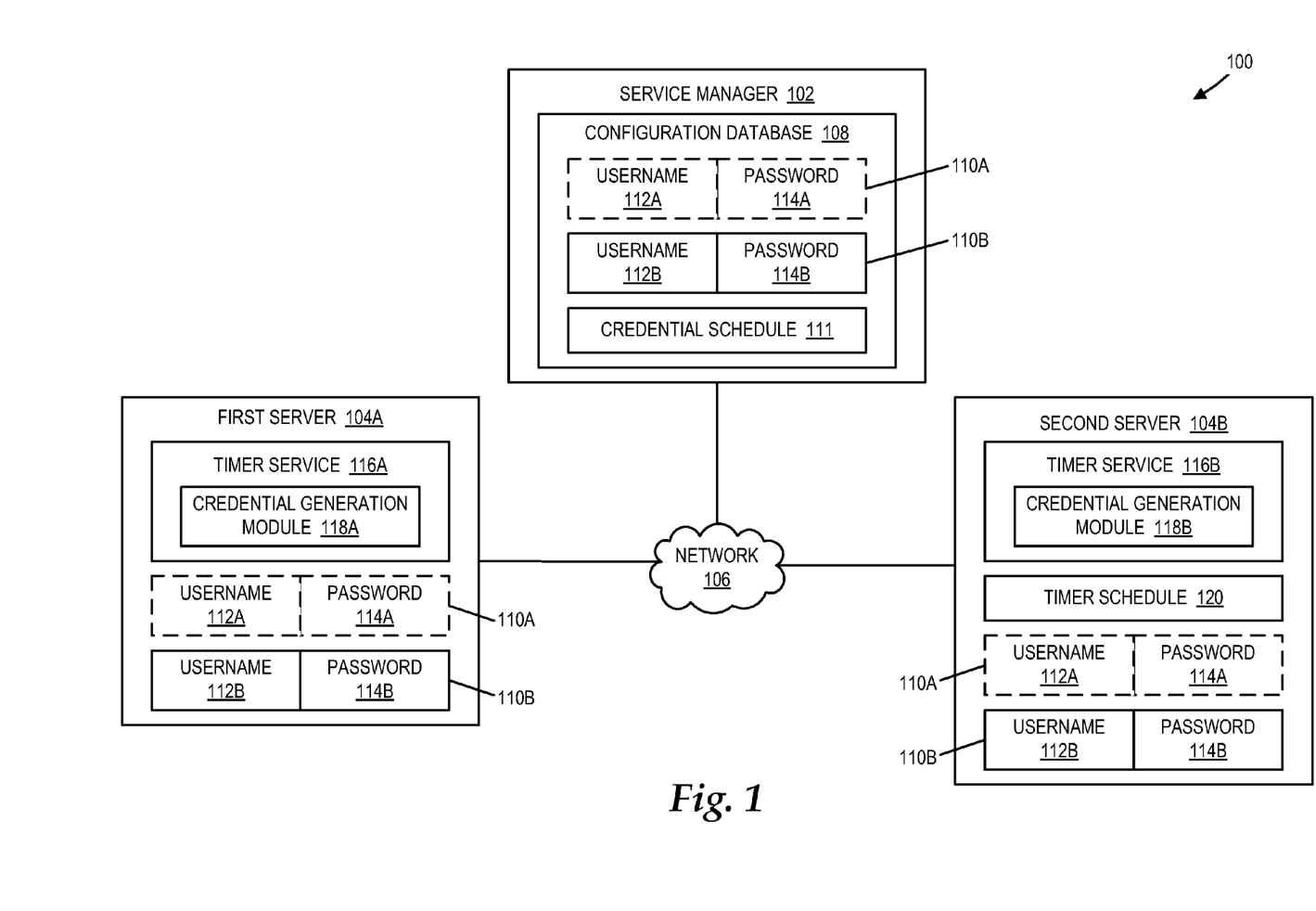
FIG. 1 is a block diagram showing a network architecture configured to generate, store, and distribute new credentials across multiple server computers, in accordance with one embodiment.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for changing credentials of a service account will be described. FIG. 1 illustrates a network architecture 100 operative to generate a credential, store the credential, and distribute the credential as necessary across multiple server computers. The network architecture 100 includes a service manager 102 and multiple server computers 104A-104B (collectively referred to as server computers 104), each of which is operatively coupled through a network 106. The server computers 104 may be part of a server farm or cluster maintained by an enterprise. For the sake of simplicity, only two server computers are illustrated in FIG. 1. However, it should be appreciated that the network architecture 100 may include any number of server computers in any suitable configuration as contemplated by those skilled in the art. In another embodiment, aspects of the service manager 102 and the server computers 104A-104B described herein may be included in a single computer.

In one embodiment, the service manager 102 includes a configuration database 108, which is adapted to store a current credential 110A. The configuration database 108 provides a central repository for storing service account credentials as well as additional service account configuration information, such as a credential schedule 111 for changing the current credential 110A. The current credential 110A includes a username 112A and a password 114A. As illustrated in FIG. 1, the current credential 110A has previously been distributed across the server computers 104.

In one embodiment, the current credential 110A enables the server computers 104 to access a shared resource (not shown), such as shared data in a database. In other embodiments, the current credential 110A may enable the server computers 104 to perform other suitable actions. In an example, the current credential 110A may enable the server computers 104 to read and modify data in a database. In another example, the current credential 110A may enable the server computers 104 to read by not modify data in a database.

In FIG. 1, the first server computer 104A and the second server computer 104B each host the same service and, as such, utilize the same service account and the current credential 110A. In other embodiments, the server computers 104 may each provide different services through different service accounts. For example, the first server computer 104A may be assigned a server farm account, and the second server computer 104B may be assigned a search account. The server farm account may enable administrative access to various configuration options, and the search account may enable a content search of one or more databases.

As illustrated in FIG. 1, the server computers 104 include timer services 116A-116B (collectively referred to as timer services 116). The first timer service 116A is associated with the first server computer 104A, and the second timer service 116B is associated with the second server computer 104B. The timer services 116 each include a credential generation module 118A-118B (collectively referred to as credential generation modules 118). As described in greater detail below, the credential generation modules 118 are operative to generate an entirely new credential or a part of a credential, such as the password.

According to the embodiments, one of the timer services 116, such as the first timer service 116A, accesses the configuration database 108 to retrieve the credential schedule 111. In one embodiment, the timer service 116 periodically (e.g., about every fifteen seconds) polls the configuration database 108 and retrieves all objects that have been changed, created, or modified. If the credential schedule 111 indicates that the duration for the current credential 110A has expired or is near expiring, then the first timer service 116A instructs the first credential generation module 118A to generate a new credential 110B. In other embodiments, a human administrator may initiate or prevent the generation of the new credential 110B.

In one embodiment, the first credential generation module 118A generates the new credential 110B to replace the current credential 110A. The new credential 110B includes a username 112B and a password 114B. In another embodiment, the first credential generation module 118A generates only the password 114B to replace the password 114A in the current credential 110A. In this case, the username 112A in the current credential 110A is not replaced and remains the same.

The first credential generation module 118A may select the new credential 110B from a list of previously generated credentials. Alternatively, the first credential generation module 118A may randomly or pseudo-randomly generate the new credential 110B using suitable username and password generation techniques. Various approaches for randomly and pseudo-randomly generating usernames and passwords are well known in the art and are not described herein.

Once the first credential generation module 118A generates the new credential 110B, the first timer service 116A replaces the current credential 110A with the new credential 110B within the first server computer 104A. The first timer service 116A then transmits the new credential 110B to the service manager 102, which replaces the current credential 110A with the new credential 110B within the configuration database 108.

Once the new credential 110B replaces the current credential 110A in the configuration database 108, the first timer service 116A generates a timer schedule 120 and transmits the timer schedule 120 to other relevant server computers, such as the second server computer 104B, that are scheduled to change expiring credentials to the new credential 110B. According to embodiments, the timer schedule 120 specifies when the second server computer 104B retrieves the retrieves new credential 110B from the configuration database 108. The timer schedule 120 may be based, at least in part, on the credential schedule 111. Upon receiving the timer schedule 120, the second timer service 116B retrieves the new credential 110B from the configuration database 108 according to the timer schedule 120 and replaces the current credential 110A with the new credential 110B within the second server computer 104B.

Once the new credential 110B replaces the current credential 110A in the configuration database 108, a number of global security settings may be updated to ensure that the new credential 110B is operational across the server computers 104. The global security settings generally refer to security settings that apply across each of the server computers 104. An example of a global security setting includes security settings for accessing remote databases and other resources not associated with the service manager 102.

Further, once the new credential 110B replaces the current credential 110A in the server computers 104, a number of local security settings and local services credential settings may also be updated to ensure that the new credential 110B is operational across the server computers 104. The local security settings generally refer to security settings associated with a given server. Examples of a local security setting may include security settings for accessing specific registry settings or file system locations. The local services credential settings generally refer to settings that ensure the services hosted by the server computers 104 correctly operate under the new credential 110B.

Upon completing the credential generation and distribution process as described above, the configuration database 108 and each of the server computers 104 have replaced the current credential 110A with the new credential 110B. Since no human intervention was involved or necessary through the process, the operation of the operation of the timer services 116 may be entirely automated, thereby reducing the responsibility of a human administrator. Further, while a human administrator may trigger the credential generation modules 118, the human administrator has no ability to view the new credential 110B. As a result, the security of the new credential 110B is significantly enhanced over conventional implementations where the human administrator can view the new credentials.

As the server computers 104 replace the current credential 110A with the new credential 110B, the server computers 104 typically reset any services utilizing the new credential 110B. During this reset operations, the services may be unavailable for a limited period of time. This period of downtime can be problematic for highly available services where minimal downtime is expected. One illustrative approach for reducing or eliminating such downtime when changing credentials of a service account.

Figure 2:
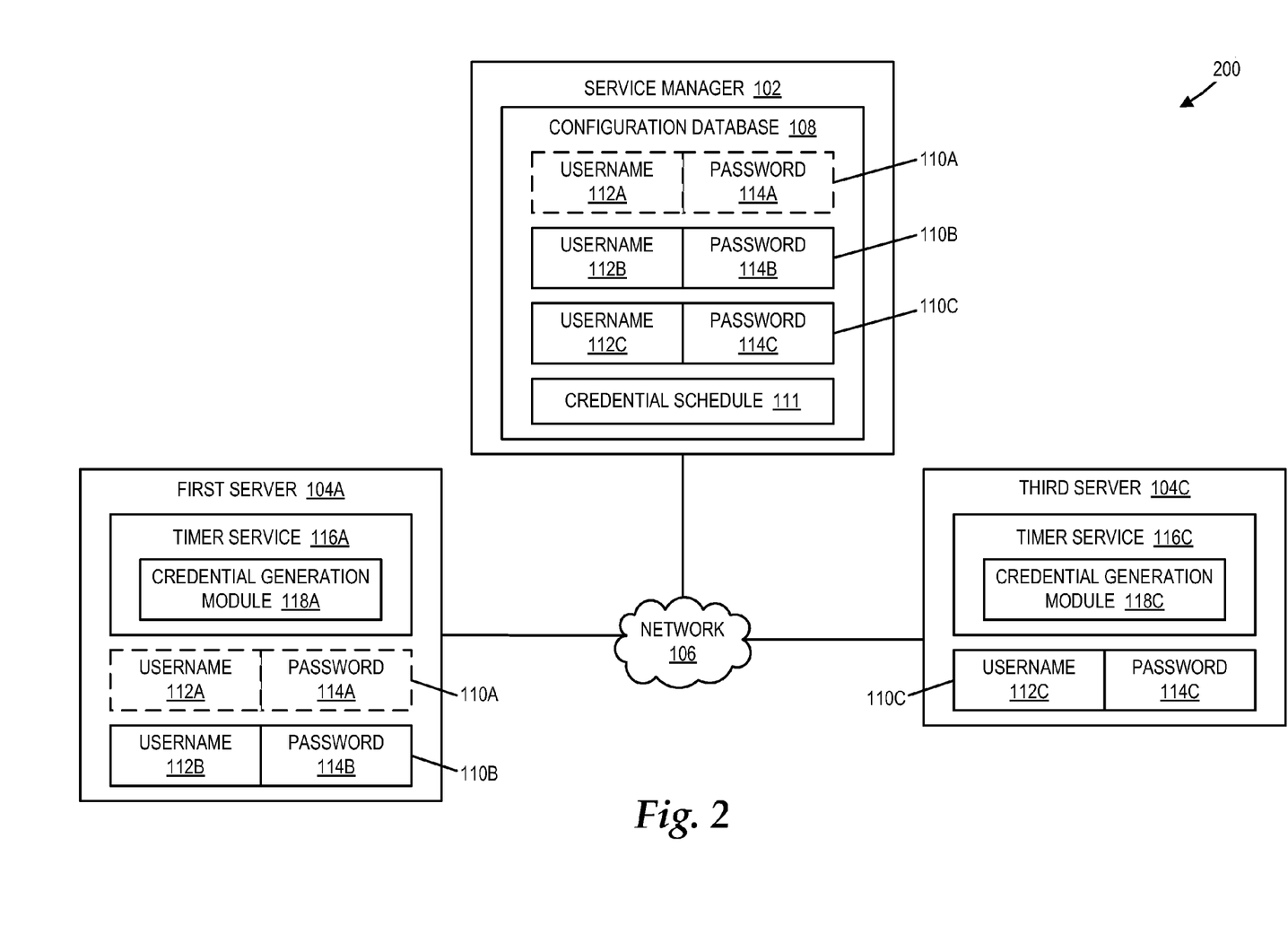
FIG. 2 is a block diagram showing another network architecture configured to generate, store, and distribute new credentials across multiple server computers, in accordance with one embodiment.

Referring now to FIG. 2 additional details will be provided regarding a service account switching process for reducing or eliminating any downtime when resetting services to operate with new credentials. In particular, FIG. 2 illustrates a network architecture 200 including the service manager 102, the first server computer 104A, and a third server computer 104C, each of which is coupled to a network 106. The third server computer 104C includes an alternate credential 110C and a third timer service 116C. The alternate credential 110C is also stored in the configuration database 108. The alternate credential 110C includes a username 112C and a password 114C. The alternate credential 110C enables the third server computer 104C to access a shared resource in order to provide a service. The third timer service 116C also includes a credential generation module 118C, which is similar to the credential generation modules 118A-118B previously described.

According to embodiments, the service manager 102 may amend the service account associated with the alternate credential 110C to include access to the same shared resources that was available to the current credential 110A. Once the alternate credential 110C has been amended, the services provided by the first server computer 104A are transferred to the third server computer 104C. The first server computer 104A is then removed from operation for handling its associated services.

Once the first server computer 104A is removed from operation, the first server computer 104A can replace the current credential 110A with the new credential 110B. Since the first server computer 104A is removed from operation, the first server computer 104A can reset any services using the current credential 110A. The reset operation transitions the services to operate under the new credential 110B. Further, since the first server computer 104A is removed from operation, the services using the new credential 110B can be tested in order to determine whether the new credential 110B, as well as the global security settings, local security settings, and local services credential settings, are properly configured. If the new credential 110B is not properly configured, then appropriate corrections can be made without any downtime to services. Further, the new credential 110B can be rolled back to the current credential 110A if necessary. The ability for the first server computer 104A to test the new credential 110B and to roll back the current credential 110A provides a significant enhancement over conventional approaches where the ability to test new credentials or to roll back previous credentials is not available.

In one embodiment, the alternate credential 110C is provided for the same class of services as the current credential 110A. The alternate credential 110C may also be associated with the same or a similar service account as the current credential 110A. The alternate credential 110C may also be set to expire at a later date than the current credential 110A. For example, the alternate credential 110C and the current credential 110A may each be set to expire every ninety days. If the alternate credential 110C is forty-five days out of phase with the current credential 110A, then the alternate credential 110C may be used as a transitional credential while the current credential 110A is replaced. Similarly, when the alternate credential 110C is replaced, the new credential 110B, assuming it successfully replaced the current credential 110A, may be used as a transitional credential.

Figure 3A:
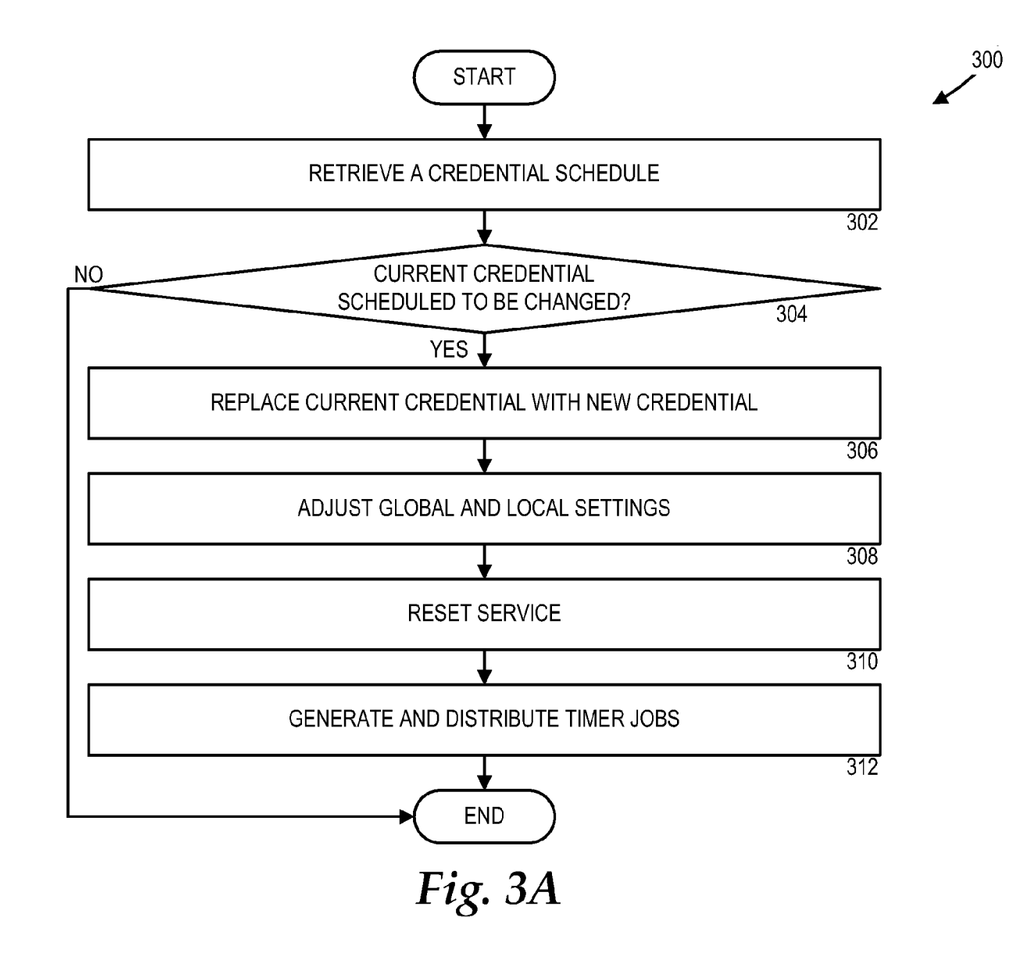
FIGS. 3A and 3B are flow diagrams showing illustrative methods for generating, storing, and distributing new credentials across multiple server computers, in accordance with one embodiment.
Figure 3B:
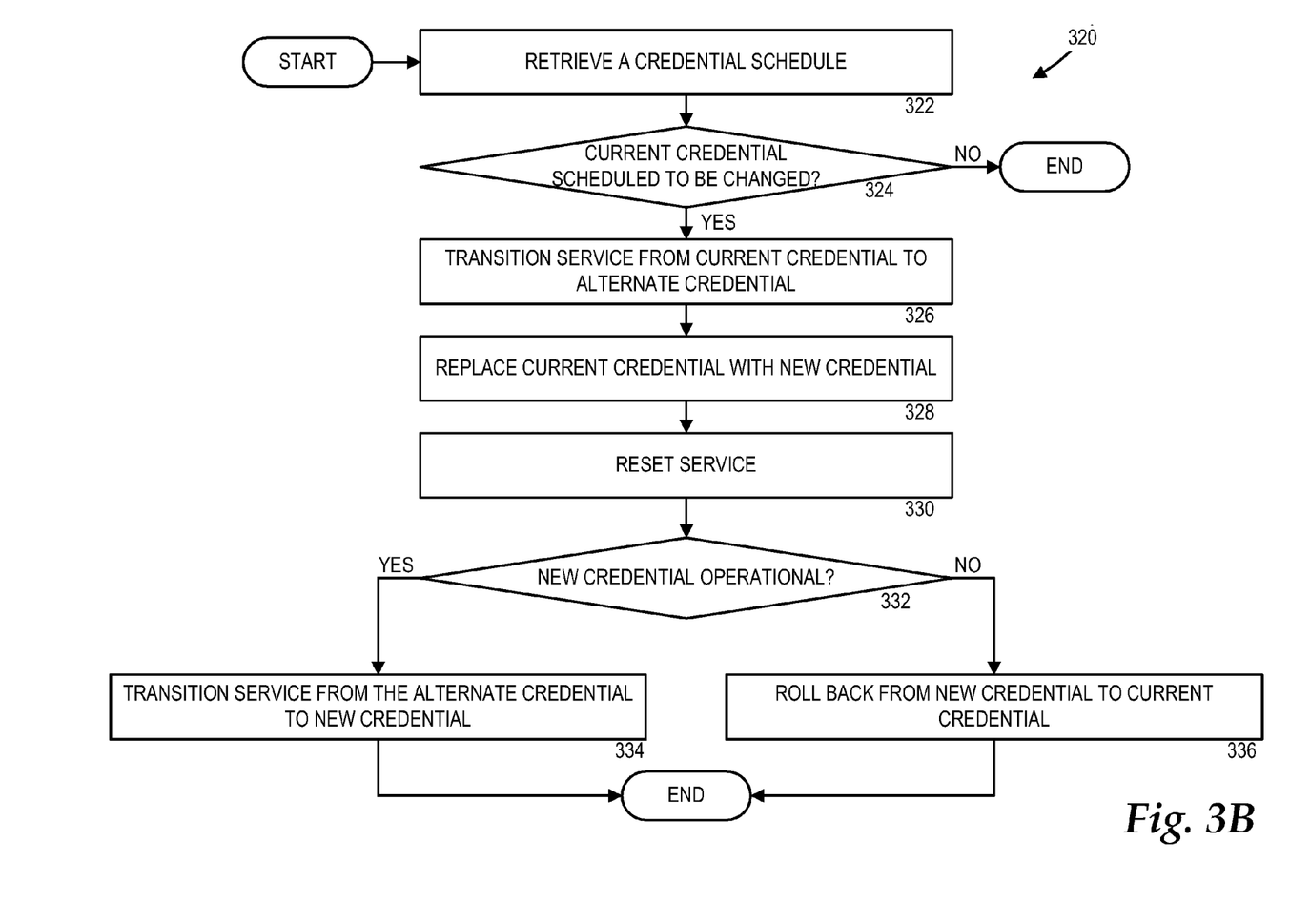

Turning now to FIGS. 3A and 3B, additional details will be provided regarding the operation of the timer services 116. In particular, FIGS. 3A and 3B are flow diagrams illustrating aspects of methods provided herein for generating, storing, and distributing credentials of a service account. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIGS. 1 and 3A, a routine 300 begins at operation 302, where the first timer service 116A retrieves the credential schedule 111 from the configuration database 108. In one embodiment, the credential schedule 111 specifies when credentials, such as the current credential 110A, are scheduled to be changed. For example, the credentials may be scheduled to change at periodic intervals as a defensive measure to prevent any potentials hackers from discovering the credentials. In this case, the amount of time between the periodic intervals may be determined by the strength of the credentials and the technology available for discovering the credentials. Upon retrieving the credential schedule 111, the routine 300 proceeds to operation 304.

At operation 304, the first timer service 116A determines whether the current credential 110A is scheduled to be changed according to the credential schedule 111. If the current credential 110A is not scheduled to be changed, then the routine 300 ends. If the current credential 110A is schedule to be changed, then the routine 300 proceeds to operation 306, where the first timer service 116A replaces the current credential 110A with the new credential 110B. In particular, the new credential 110B may replace the current credential 110A at the first server computer 104A. The first timer service 116A may also transmit the new credential 110B to the service manager 102, where the new credential 110B also replaces the current credential 110A at the configuration database 108. The new credential 110B may be generated by the first credential generation module 118A. Upon replacing the current credential 110A with the new credential 110B, the routine 300 proceeds to operation 308.

At operation 308, the first timer service 116A adjusts any global and local settings, ensuring that the new credential 110B operates with the same settings as the current credential 110A. The global settings may include global security settings, as previously described. The local settings may include local security settings and local services credential settings, also as previously described. Upon adjusting the global and local settings, the routine 300 proceeds to operations 310 and 312.

At operation 310, the first timer service 116A resets any services that utilize the new credential 110B to access shared resources. As the services are reset, the services transition from utilizing the current credential 110A to utilizing the new credential 110B instead. At operation 312, the first timer service 116A also generates the timer schedule 120 for other server computers, such as the second server computer 104B, hosting services that utilize the current credential 110A. The timer schedule 120 may be based, at least in part, on the credential schedule 111. The first timer service 110 may transmit the timer schedule 120 to the appropriate server computers, such as the second server computer 104B. The second server computer 104B may then utilize the timer schedule 120 to retrieve the new credential 110B from the configuration database 108 and to replace the current credential 110A at the second server computer 104B with the new credential 110B.

Referring to FIGS. 2 and 3B, a routine 320 begins at operation 322, where the first timer service 116A retrieves the credential schedule 111 from the configuration database 108. The routine proceeds to operation 324, where the first timer service 116A determines whether the current credential 110A is scheduled to be changed according to the credential schedule 111. If the current credential 110A is not scheduled to be changed, then the routine 320 ends. If the current credential 110A is scheduled to be changed, then the routine 320 proceeds to operation 326.

At operation 326, the first timer service 116A transitions any services associated with the current credential 110A to the alternate credential 110C at the third server computer 104C. The alternate credential 110C may be selected because it is associated with the same classes of services as those provided under the current credential 110A. The alternate credential 110C may be updated in order to include security settings enabling the alternate credential 110C to provide access to the same resources provided by the current credential 110A. Upon transitioning the services from the current credential 110A to the alternate credential 110C, the routine 320 proceeds to operation 328.

At operation 328, the first timer service 116A replaces the current credential 110A with the new credential 110B. The new credential 110B may be generated by the first credential generation module 118A. The routine 320 then proceeds to operation 330, where the first timer service 116A resets any services that utilize the new credential 110B to access shared resources. As the services are reset, the services transition from utilizing the current credential 110A to utilizing the new credential 110B instead. Upon resetting the services, the routine 320 proceeds to operation 332.

At operation 332, the first timer service 116A tests the new credential 110B to determine whether it is operational. In particular, the first timer service 116A may test the services operating under the new credential 110B to ensure that the services can access the same resources that were accessible under the current credential 110A. If the new credential 110B is operational, then the routine 320 proceeds top operation 334 where the first timer service 116A transitions the service from the alternate credential 110C at the third server computer 104C to the new credential 110B. If the new credential 110B is not operational, then the routine 320 proceeds to operation 336, where the first timer service 116A may roll back to the new credential 110B to the current credential 110A Referring now to FIG. 4, an exemplary computer architecture diagram showing aspects of a computer 400 is illustrated. Examples of the computer 400 include the service manager 102 and the server computers 104A-104C. The computer 400 includes a processing unit 402 ("CPU"), a system memory 404, and a system bus 406 that couples the memory 404 to the CPU 402. The computer 400 further includes a mass storage device 412 for storing one or more program modules 414 and one or more databases 416. Examples of the program modules 414 may include the timer services 116A-116C and the credential generation modules 118A-118C. An example of the databases 416 includes the configuration database 108. The mass storage device 412 is connected to the CPU 402 through a mass storage controller (not shown) connected to the bus 406. The mass storage device 412 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

Figure 4:
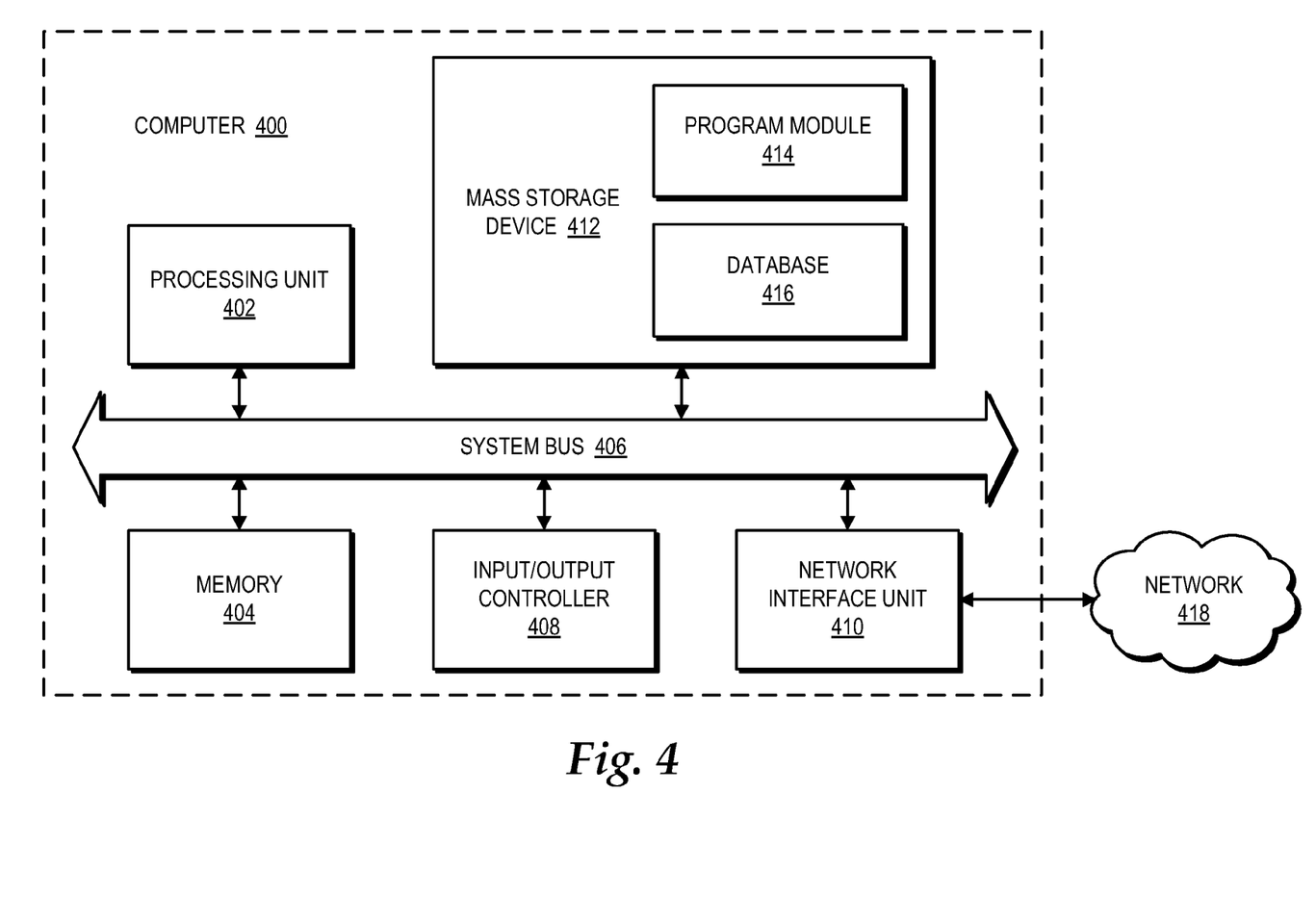
FIG. 4 is a computer architecture diagram showing aspects of an illustrative computer hardware architecture for a computing system capable of implementing aspects of the embodiments presented herein.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 418. The computer 400 may connect to the network 418 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

Based on the foregoing, it should be appreciated that technologies for providing generating, storing, and distributing changed credentials of service accounts are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for generating and changing a credential for a service account, the service account being associated with a service hosted at a first server computer, the service utilizing a current credential to access shared data, the method comprising:
    retrieving, from a configuration database at a second server computer over a network to a first server computer, a credential schedule specifying when a plurality of credentials are scheduled to be changed, the first computer hosting the service associated with the service account;
    determining, by the first server computer, whether the current credential is scheduled to be changed according to the credential schedule;
    upon determining that the current credential is scheduled to be changed, generating, by the first server computer, at least part of a new credential;
    replacing the current credential with the at least part of the new credential at the first server computer;
    transmitting the new credential over the network from the first server computer to the configuration database at the second server computer, the configuration database adapted to store the plurality of credentials for a plurality of service accounts;
    generating, by the first server computer, a timer job specifying when a third server computer is scheduled to retrieve the new credential from the configuration database at the second server computer, the new credential for replacing the current credential at the third server computer;
    transmitting the timer job from the first server computer to the third server computer;
    transitioning the service from the first server computer utilizing the current credential to a fourth server computer utilizing an alternate credential, where the fourth server computer, instead of the first server computer, hosts the service while the current credential at the first server computer is replaced;
    upon transitioning the service hosted at the first server computer to the fourth server computer, replacing the current credential with the new credential at the first server computer;
    upon replacing the current credential with the new credential at the first server computer, resetting the service at the first server computer and causing the service to utilize the new credential instead of the current credential;
    upon resetting the service, testing whether the service at the first server computer is properly operating utilizing the new credential; and
    upon determining that the service is properly operating utilizing the new credential, transitioning the service from the fourth server computer utilizing the alternate credential to the first server computer utilizing the new credential, where the first server computer, instead of the fourth server computer, hosts the service.

2. The method of claim 1, further comprising:
    adjusting global settings associated with a plurality of server computers utilizing the new credential; and
    adjusting local settings associated with the first server computer utilizing the new credential.

3. The method of claim 1, wherein generating at least part of a new credential comprises generating a username and a password.

4. The method of claim 1, further comprising upon determining that the service is not properly operating utilizing the new credential, replacing the new credential with the current credential at the first server computer.

5. A computer-readable storage medium that is not a signal having computer-executable instructions stored thereon which, when executed by a computer, cause the computer to:
    retrieve a credential schedule from a second server computer to a first server computer, the credential schedule specifying when a plurality of credentials are scheduled to be changed, the plurality of credentials being associated with a plurality of service accounts, the first server computer hosting a service associated with the service account;
    determine, by the first server computer, whether a current credential associated with a service account is scheduled to be changed according to the credential schedule;
    upon determining that the current credential is scheduled to be changed, generate, by the first server computer, at least part of a new credential;
    transition the service from the first server computer utilizing the current credential to a third server computer utilizing an alternate credential, where the third server computer, instead of the first server, hosts the service while the current credential at the first computer is replaced;
    upon transitioning the service hosted at the first server computer to the third server computer, replace the current credential with the new credential at the first server computer;
    upon replacing the current credential with the new credential at the first server computer, reset the service at the first server computer and causing the service to utilize the new credential instead of the current credential;
    upon resetting the service, test whether the service at the first server computer is properly operating utilizing the new credential;
    upon determining that the service is properly operating utilizing the new credential, transition the service from the third server computer utilizing the alternate credential to the first server computer utilizing the new credential, where the first server computer, instead of the third server computer, hosts the service;
    generate, by the first server computer, a timer job specifying when a fourth server computer is scheduled to retrieve the new credential from a configuration database at the second server computer, the new credential for replacing the current credential at the fourth server computer; and
    transmit the timer job from the first server computer to the fourth server computer.

6. The computer-readable storage medium of claim 5, wherein to replace the current credential with the new credential for the service account, the computer-executable instructions stored thereon which, when executed by a computer, cause the computer to:

transmit the new credential from the first server computer to a configuration database at the second server computer, the configuration database containing the plurality of credentials associated with the plurality of service accounts.

7. The computer-readable storage medium of claim 5 having further computer-executable instructions stored thereon which, when executed by a computer, cause the computer to upon determining that the service is not properly operating utilizing the new credential, replace the new credential with the current credential at the first server computer.

* * * * *